US010880896B2

(12) United States Patent
Sadiq et al.

(10) Patent No.: US 10,880,896 B2
(45) Date of Patent: Dec. 29, 2020

(54) IDENTIFYING BEAMS OF INTEREST FOR POSITION ESTIMATION

(71) Applicant: QUALCOMM Incorporated, San Diego, CA (US)

(72) Inventors: Bilal Sadiq, Basking Ridge, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/425,503

(22) Filed: May 29, 2019

(65) Prior Publication Data

US 2019/0373595 A1 Dec. 5, 2019

Related U.S. Application Data

(60) Provisional application No. 62/679,000, filed on May 31, 2018.

(51) Int. Cl.
*H04W 72/04* (2009.01)
*H04W 64/00* (2009.01)
(Continued)

(52) U.S. Cl.
CPC ......... *H04W 72/048* (2013.01); *G01S 5/0215* (2013.01); *H04B 7/0408* (2013.01);
(Continued)

(58) Field of Classification Search
CPC . H04W 72/048; H04W 72/04; H04W 72/046; H04W 72/08; H04W 72/085;
(Continued)

(56) References Cited

U.S. PATENT DOCUMENTS 10,110,326 B1\* 10/2018 Kyrolainen et al. ..................... H04B 17/0087
2003/0036390 A1\* 2/2003 Villier et al. ................. 455/456
(Continued)

FOREIGN PATENT DOCUMENTS

| CA | 2088725 A1 | 1/1994 |
|---|---|---|
| EP | 1034677 A1 | 9/2000 |
| EP | 3306337 A1 | 4/2018 |

OTHER PUBLICATIONS

Intel Corporation: "On the Need of New QCL Parameters in NR", 3GPP Draft; R1-166563, 3rd Generation Partnership Project(3GPP), Mobile Competence Centre; 650, Route Des Lucioles; F-06921, Sophia-Antipolis Cedex; France, vol. RAN WG1, No. Gothenburg, Sweden; Aug. 22, 2016-Aug. 26, 2016, Aug. 13, 2016, XP051132848, Retrieved from the Internet: URL:http://www.3gpp.org/ftp/tsg_ran/WG1_RL1/TSGR1_86/Docs/ [retrieved on Aug. 13, 2016], 4 pages, abstract.

(Continued)

*Primary Examiner* — Meless N Zewdu
(74) *Attorney, Agent, or Firm* — Thien T. Nguyen

(57) ABSTRACT

Disclosed are techniques for calculating timing metrics. A method comprises receiving, at a first node and from a second node, a set of beams, determining one or more times of arrival for each beam in the set of beams, identifying a positioning subset of beams based on the one or more times of arrival, wherein the positioning subset of beams is smaller than the set of beams and includes one or more beams from the set of beams, and calculating a timing metric based on the one or more times of arrival associated with the positioning subset of beams.

30 Claims, 10 Drawing Sheets

(51) Int. Cl.
*H04W 56/00* (2009.01)
*G01S 5/02* (2010.01)
*H04W 72/08* (2009.01)
*H04B 7/0408* (2017.01)

(52) U.S. Cl.
CPC ....... *H04W 56/001* (2013.01); *H04W 64/006* (2013.01); *H04W 72/046* (2013.01); *H04W 72/085* (2013.01)

(58) Field of Classification Search
CPC ... H04W 64/00; H04W 64/006; H04W 56/00; H04W 56/001; H04W 16/24; H04W 16/28; H04W 56/006; H04W 56/0075; H04W 56/008; H04W 56/0095; H04W 56/0065; H04W 88/00; H04W 88/02; H04W 88/08; H04W 52/0229; H04B 7/0408; H04B 7/0413; H04B 7/043; H04B 7/0452; H04B 7/0639; H04B 7/0695; H04B 7/0615; H04B 7/0617; H04B 7/08; H04B 7/088; H04B 7/06; H04B 7/022; G01S 5/00; G01S 5/02; G01S 5/0215; G01S 5/26; G01S 19/42; G01S 2205/00; G01S 2205/001; G01S 2205/008; G01S 5/0027; G01S 5/0036; G01S 5/0045; G01S 5/0054; G01S 5/0063; G01S 5/009; G01S 5/0009; G01S 5/10; G01S 1/802; G01S 1/805; G01S 1/807; G01S 3/46; G01S 3/465; G01S 3/48; G01S 3/50; G01S 3/52; G01S 7/4865; G01S 7/487; G01S 1/02; G01S 1/00

See application file for complete search history.

(56) References Cited

U.S. PATENT DOCUMENTS

| | | | |
|---|---|---|---|
| 2015/0257073 A1* | 9/2015 | Park et al. | H04W 36/30 |
| 2018/0048375 A1* | 2/2018 | Guo et al. | H04B 7/0695 |
| 2018/0054286 A1 | 2/2018 | Tang et al. | |
| 2018/0269945 A1* | 9/2018 | Zhang et al. | H04B 7/0617 |
| 2019/0053234 A1* | 2/2019 | Cui et al. | H04W 72/0446 |
| 2019/0068315 A1* | 2/2019 | Ryden et al. | H04L 1/0009 |
| 2019/0074891 A1* | 3/2019 | Kwon et al. | H04B 7/0695 |
| 2019/0124639 A1* | 4/2019 | Nilsson et al. | H04W 72/046 |
| 2019/0285721 A1* | 9/2019 | Xiong et al. | G01S 5/0215 |
| 2019/0356514 A1* | 11/2019 | Schrammar et al. | H04L 25/0224 |

OTHER PUBLICATIONS

International Search Report and Written Opinion—PCT/US2019/034649—ISA/EPO—dated Jul. 24, 2019.
Mendrzik R., et al., "Harnessing NLOS Components for Position and Orientation Estimation in 5G mmWave MIMO", arxiv.org, Cornell University Library, 201 Olin Library Cornell University Ithaca, NY 14853, Dec. 5, 2017 (Dec. 5, 2017), XP080844669, 29 Pages, pp. 11, 14.

* cited by examiner

IDENTIFYING BEAMS OF INTEREST FOR POSITION ESTIMATION

CROSS-REFERENCE TO RELATED APPLICATION

The present Application for Patent claims the benefit of U.S. Provisional Application No. 62/679,000, entitled "IDENTIFYING BEAMS OF INTEREST FOR POSITION ESTIMATION," filed May 31, 2018, assigned to the assignee hereof and expressly incorporated herein by reference in its entirety.

TECHNICAL FIELD

Various aspects described herein generally relate to wireless communication systems, and more particularly, to identifying beams of interest for position estimation.

INTRODUCTION

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that significant propagation loss may occur due to the high frequency. As the frequency increases, the wavelength decreases, and propagation losses may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect from other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may herein refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcast by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimates in terrestrial wireless networks, a mobile device can be configured to measure and report the observed time difference of arrival (OTDOA) or reference signal timing difference (RSTD) between reference RF signals received from two or more network nodes (e.g., different base stations, or different transmission points (e.g., antennas) belonging to the same base station).

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Techniques for identifying beams of interest for position estimation are disclosed. According to an aspect, a method of identifying beams of interest for position estimation includes receiving, at a first node, a set of beams from a second node, determining one or more times of arrival for each beam in the set of beams, identifying a positioning subset of beams based on the one or more times of arrival for each beam in the set of beams, where the positioning subset of beams is smaller than the set of beams and includes one or more beams from the set of beams, and calculating a timing metric based on the one or more times of arrival associated with the positioning subset of beams.

According to further aspects, each beam in the set of beams is associated with a beam index and transmission at an angle of departure, where each beam in the set of beams has a different angle of departure and a different beam index from other beams in the set of beams. The positioning subset of beams may include one or more beams associated with earlier times of arrival than each of one or more remaining beams, where the one or more remaining beams are included in the set of beams and not included in the positioning subset of beams. Data relating to the times of arrival associated with each of the one or more remaining beams may be discarded. Further, the positioning subset of beams may include a beam associated with a cluster of multiple RF signals, and calculating the timing metric includes calculating the timing metric based on a time of arrival of an earliest-arriving RF signal in the cluster, an average time of arrival of the multiple RF signals in the cluster, a time of arrival of a highest-strength RF signal of the multiple RF signals in the cluster, or any combination thereof.

In another aspect, a signal strength for each beam in the set of beams may be determined, a data subset of beams based on the signal strengths may be identified, where the data subset of beams is smaller than the set of beams and includes at least one beam that is not included in the positioning subset of beams; and a data exchange via the data subset of beams may be requested and performed.

According to another aspect, the set of beams is a set of second-node beams, the positioning subset of beams is a positioning subset of second-node beams, and the timing metric is a second-node timing metric. At the first node, a set of third-node beams may be further received from a third node, one or more times of arrival for each beam in the set of third-node beams may be determined; and a positioning subset of third-node beams based on the one or more times of arrival may be identified, where the positioning subset of third-node beams is smaller than the set of third-node beams and includes one or more beams from the set of third-node beams, and a third-node timing metric calculated based on the one or more times of arrival associated with the positioning subset of third-node beams. Further, an Observed Time Difference Of Arrival (OTDOA) timing metric based on the second-node timing metric and the third-node timing metric may be calculated.

In a related aspect, the timing metric is a second-node timing metric, and a third-node timing metric may be received from a third node. Calculating the timing metric may then further include calculating an Observed Time Difference Of Arrival (OTDOA) metric equal to a difference between the second-node timing metric and the third-node timing metric.

An additional aspect provides that receiving the set of beams includes receiving a set of positioning beams, where each beam in the set of positioning beams carries a timing beacon signal. Another aspect provides that receiving the set of beams may include receiving a set of reference-signaling beams, and identifying the positioning subset of beams includes receiving Quasi-Co-Location (QCL) information, determining, based on the QCL information, whether the set of reference-signaling beams has a same spatial QCL as a set of positioning beams transmitted by the second node, and identifying the positioning subset of beams based on the times of arrival associated with the reference-signaling beams.

In another aspect, an apparatus for identifying beams of interest for position estimation includes at least one transceiver configured to receive, at a first node, a set of beams and from a second node, a set of beams, a memory configured to store data and/or instructions, and one or more processors, coupled to the memory and the at least one transceiver, that is configured to determine one or more times of arrival for each beam in the set of beams, identify a positioning subset of beams based on the one or more times of arrival for each beam in the set of beams, wherein the positioning subset of beams is smaller than the set of beams and includes one or more beams from the set of beams, and calculate a timing metric based on the one or more times of arrival associated with the positioning subset of beams. Further, each beam in the set of beams may be associated with a beam index, and transmission at an angle of departure, where each beam in the set of beams has a different beam index and a different angle of departure from other beams in the set of beams.

In a further aspect, the positioning subset of beams may include one or more beams that are associated with earlier times of arrival than each of one or more remaining beams, where the one or more remaining beams are included in the set of beams and not included in the positioning subset of beams. The one or more processors may be further configured to discard data relating to the times of arrival associated with each of the one or more remaining beams. The positioning subset of beams may also include a beam associated with a cluster of multiple RF signals, and to calculate the timing metric, the one or more processors may be further configured to calculate the timing metric based on a time of arrival of an earliest-arriving RF signal in the cluster, an average time of arrival of the multiple RF signals in the cluster, a time of arrival of a highest-strength RF signal of the multiple RF signals in the cluster, or any combination thereof.

In an aspect, the one or more processors is further configured to determine a signal strength for each beam in the set of beams, identify a data subset of beams based on the signal strengths, wherein the data subset of beams is smaller than the set of beams and includes at least one beam that is not included in the positioning subset of beams, and exchange data via the data subset of beams and/or requesting a data exchange via the data subset of beams.

In a further aspect, the set of beams is a set of second-node beams, the positioning subset of beams is a positioning subset of second-node beams, and the timing metric is a second-node timing metric, where the at least one transceiver is further configured to receive, at the first node and from a third node, a set of third-node beams, and the one or more processors is further configured to determine a time of arrival for each beam in the set of third-node beams, identify a positioning subset of third-node beams based on the times of arrival, where the positioning subset of third-node beams is smaller than the set of third-node beams and includes one or more beams from the set of third-node beams, and calculate a third-node timing metric based on one or more times of arrival respectively associated with each beam in the positioning subset of third-node beams.

According to other aspect, the one or more processors may be further configured to calculate an Observed Time Difference Of Arrival (OTDOA) timing metric based on the second-node timing metric and the third-node timing metric.

In an aspect, the timing metric is a second-node timing metric, and the at least one transceiver is further configured to receive a third-node timing metric from a third node, and the one or more processors is further configured to calculate the timing metric and an Observed Time Difference Of Arrival (OTDOA) metric equal to a difference between the second-node timing metric and the third-node timing metric.

In an aspect, to receive the set of beams, the at least one transceiver is configured to receive a set of positioning beams, where each beam in the set of positioning beams carries a timing beacon signal. In another aspect, to receive the set of beams, the at least one transceiver may be configured to receive a set of reference-signaling beams. To identify the positioning subset of beams, the at least one transceiver is configured to receive Quasi-Co-Location (QCL) information, and the one or more processors is configured to determine, based on the QCL information, whether the set of reference-signaling beams has a same spatial QCL as a set of positioning beams transmitted by the second node, and identify the positioning subset of beams based on the times of arrival associated with the reference-signaling beams.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
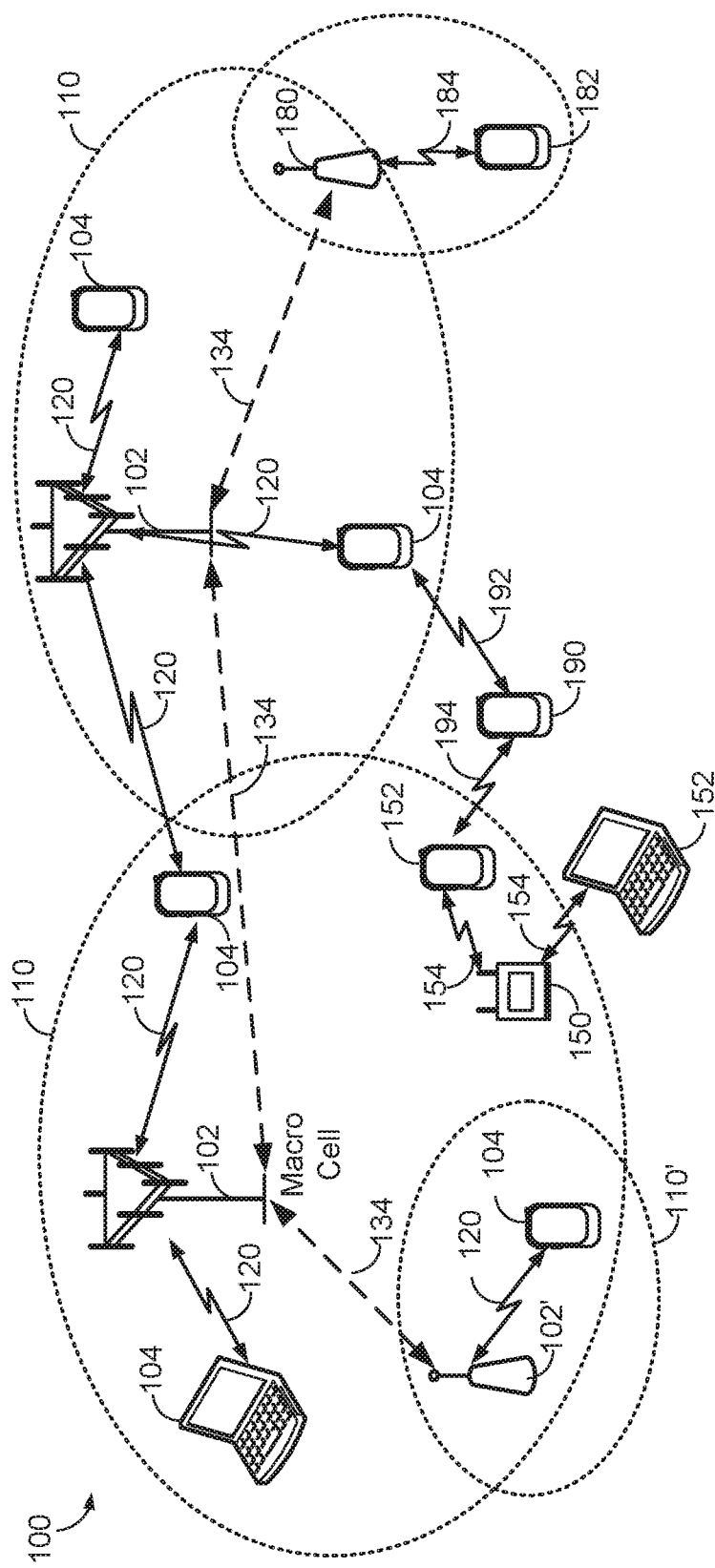
FIG. 1 illustrates an exemplary wireless communications system, according to various aspects.

Various aspects described herein generally relate to wireless communication systems, and more particularly, to identifying beams of interest for position estimation. These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, which can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

In accordance with various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links 134. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, the small cell 102' may have a geographic coverage area 110' that substantially overlaps with the geographic coverage area 110 of one or more macro base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE or 5G technology and use the same 5 GHz unlicensed frequency spectrum as used by the WLAN AP 150. The small cell 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with UE 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
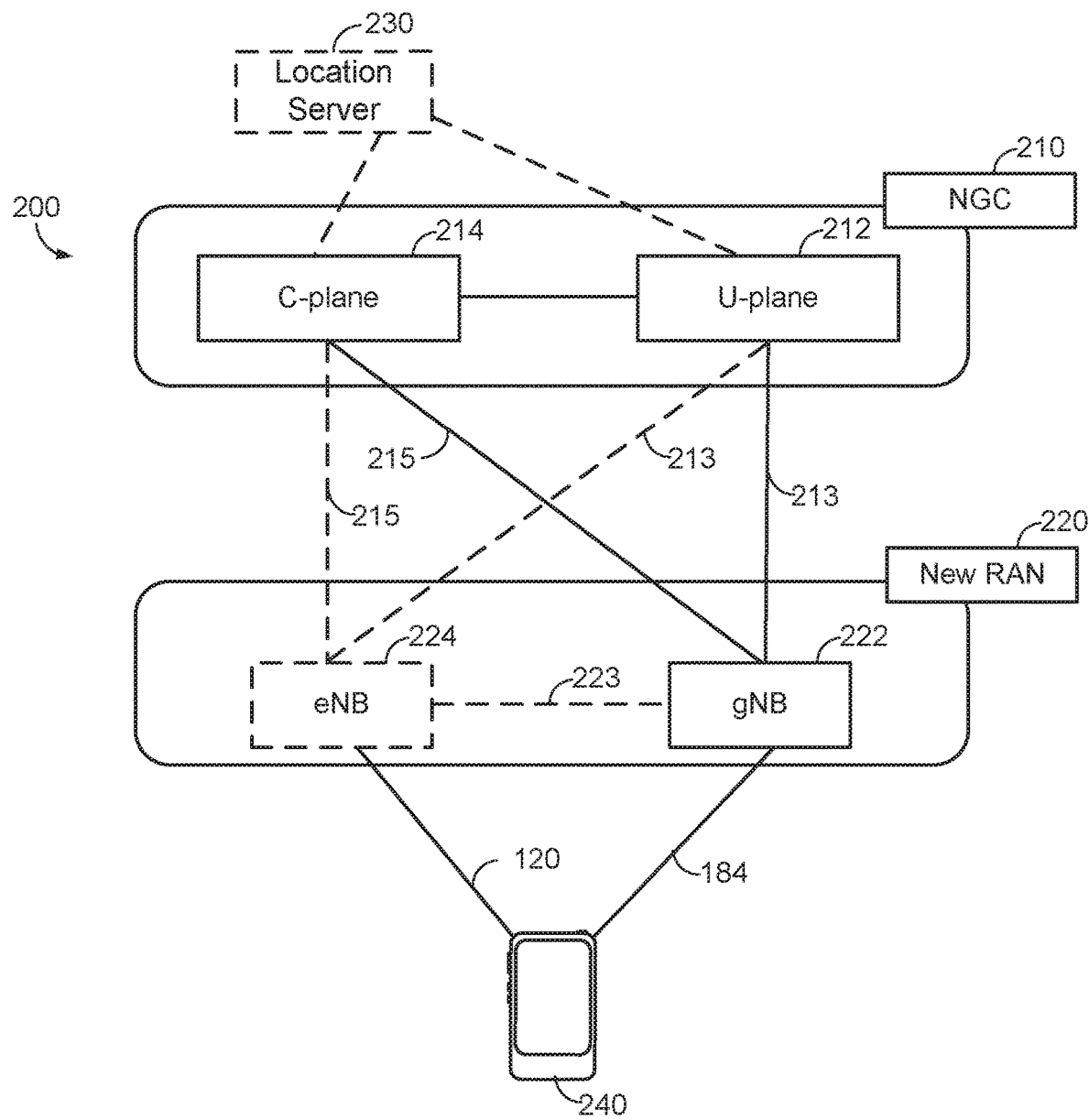
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
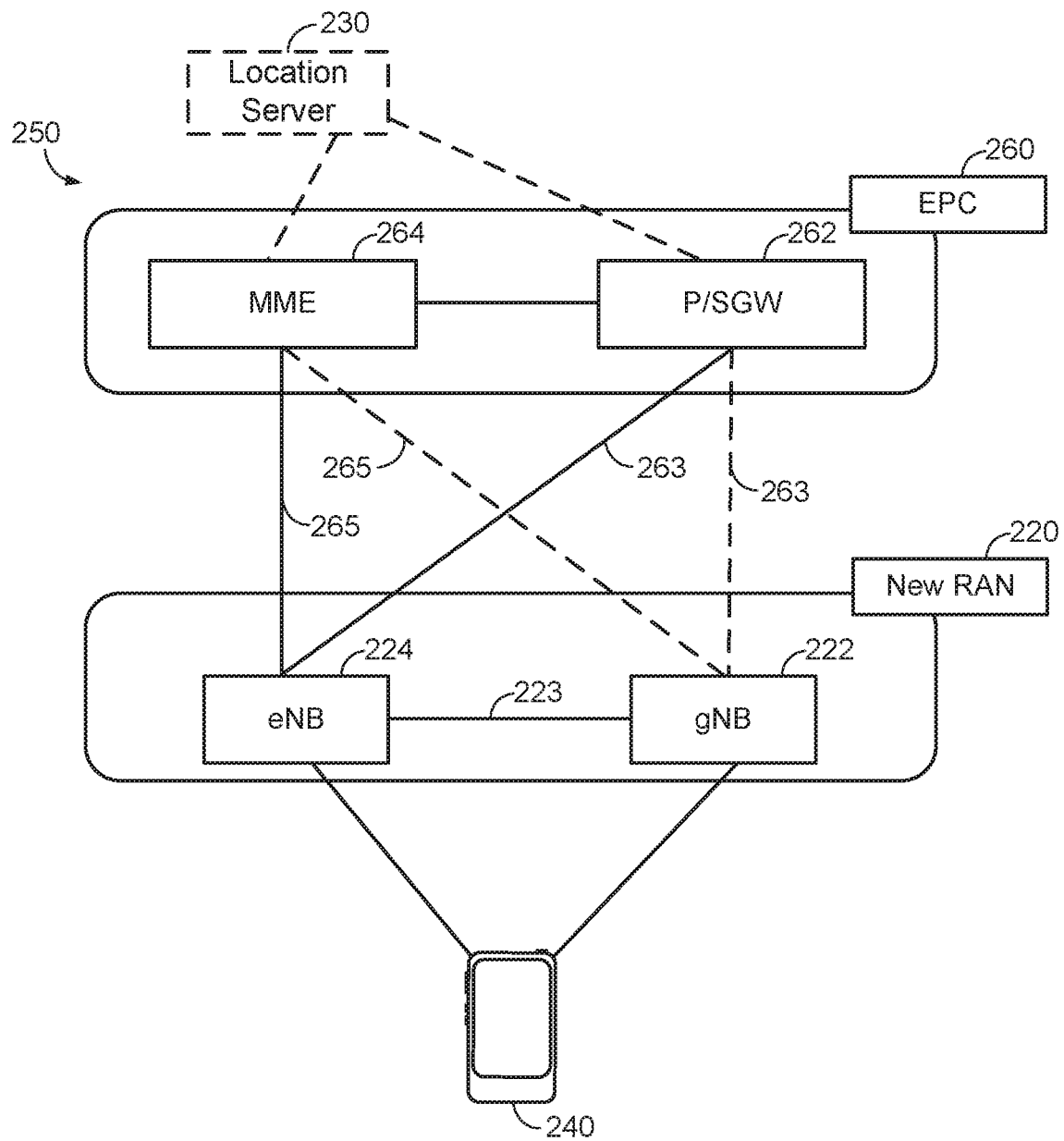

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW), 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the EPC 260 to provide location assistance for UEs 240. The location server 230 can be implemented as a plurality of structurally separate servers, or alternately may each correspond to a single server.

The location server 230 can be configured to support one or more location services for UEs 240 that can connect to the location server 230 via the core network, EPC 260, and/or via the Internet (not illustrated).

Figure 3:
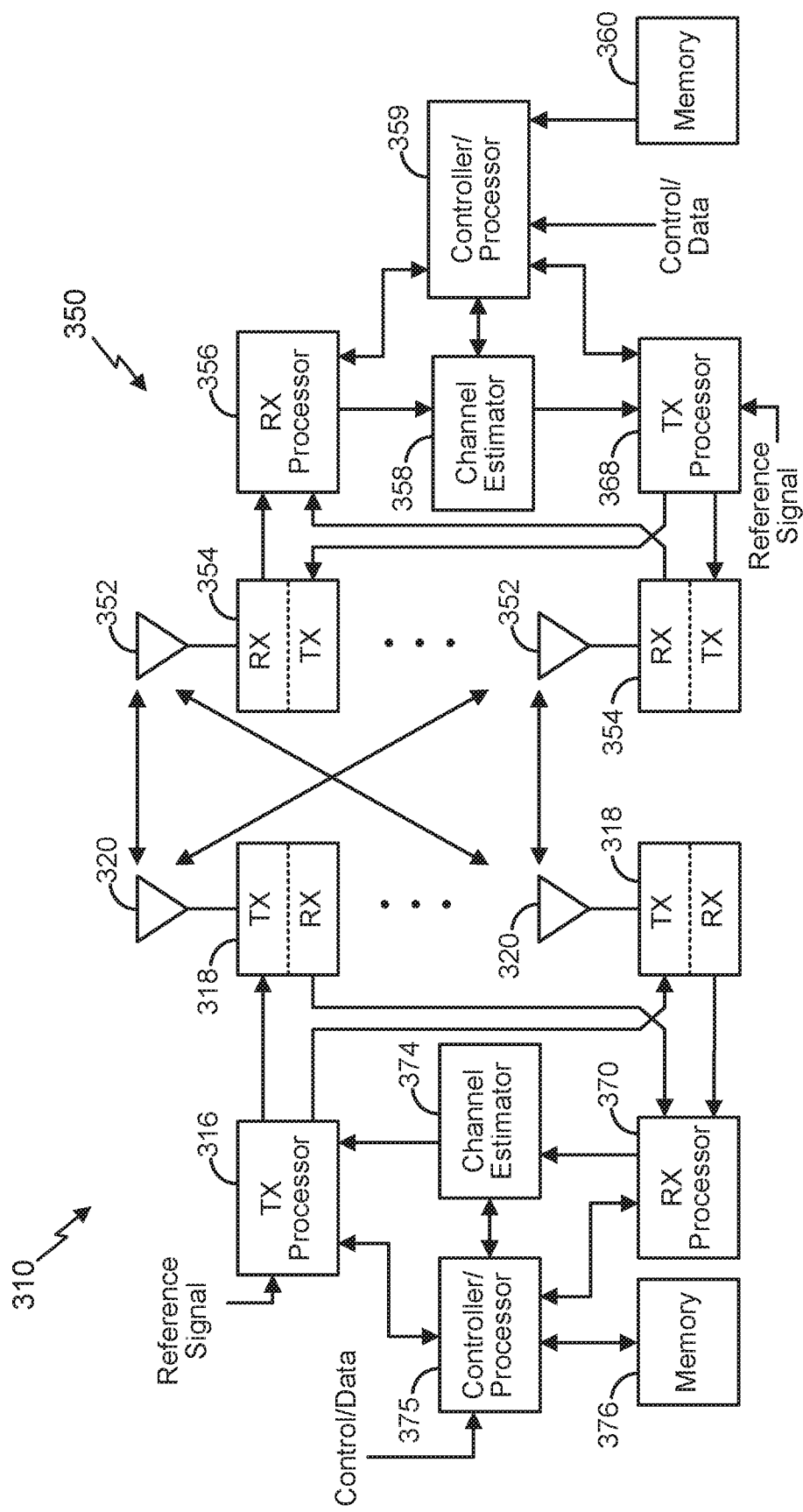
FIG. 3 illustrates an exemplary base station and an exemplary UE in an access network, according to various aspects.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides de-multiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, de-multiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides de-multiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4:
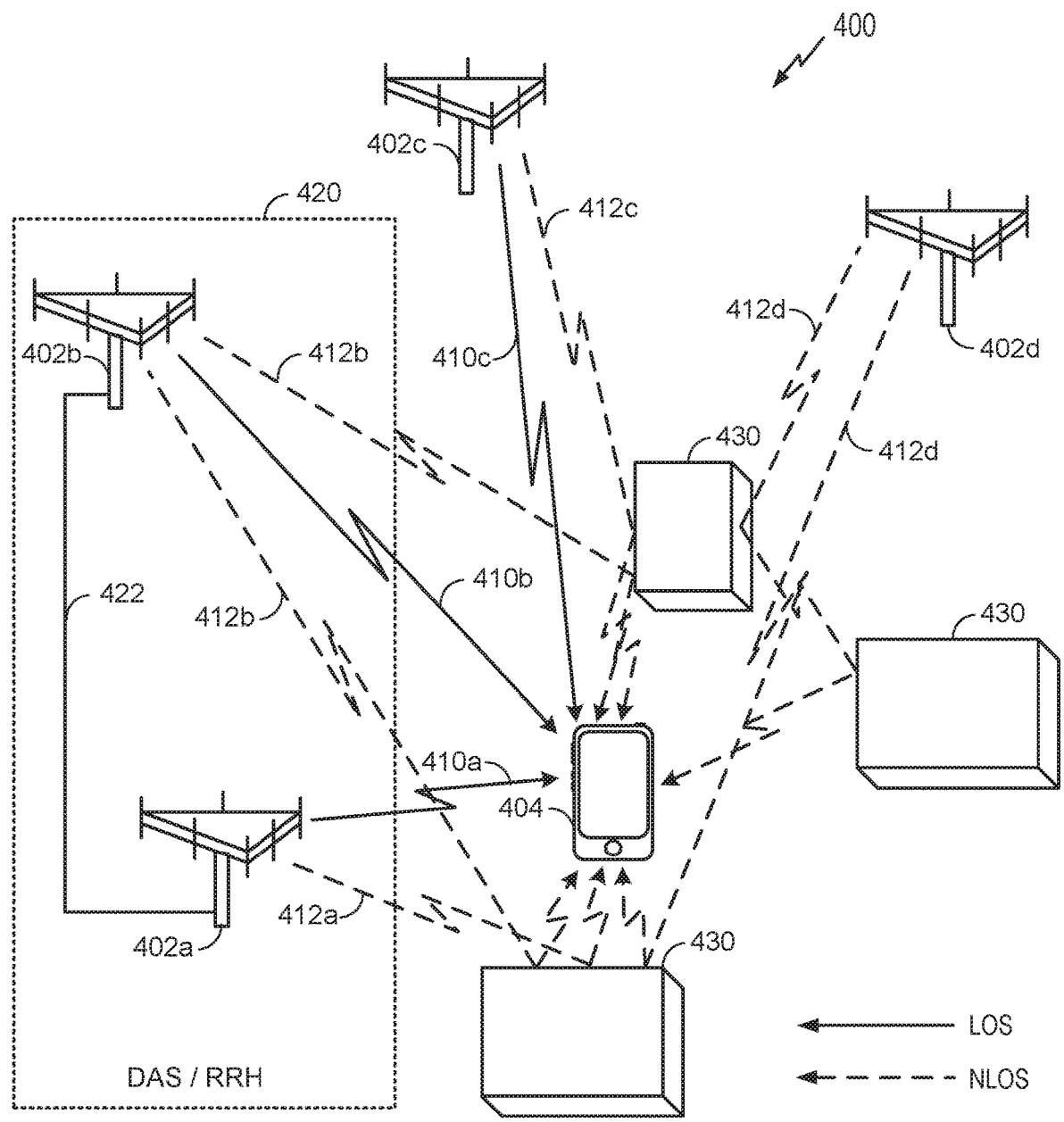
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations' locations, geometry, etc.) the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excites the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations themselves 402 (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna (s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect from other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects from some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space from the transmitter to the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beams. As described below with reference to FIG. 5, in some cases, the signal strength of RF signals on the LOS path 410 may be weaker (e.g., due to obstructions) than the signal strength of RF signals on an NLOS path 412, over which the RF signals arrive later due to propagation delay.

Figure 5:
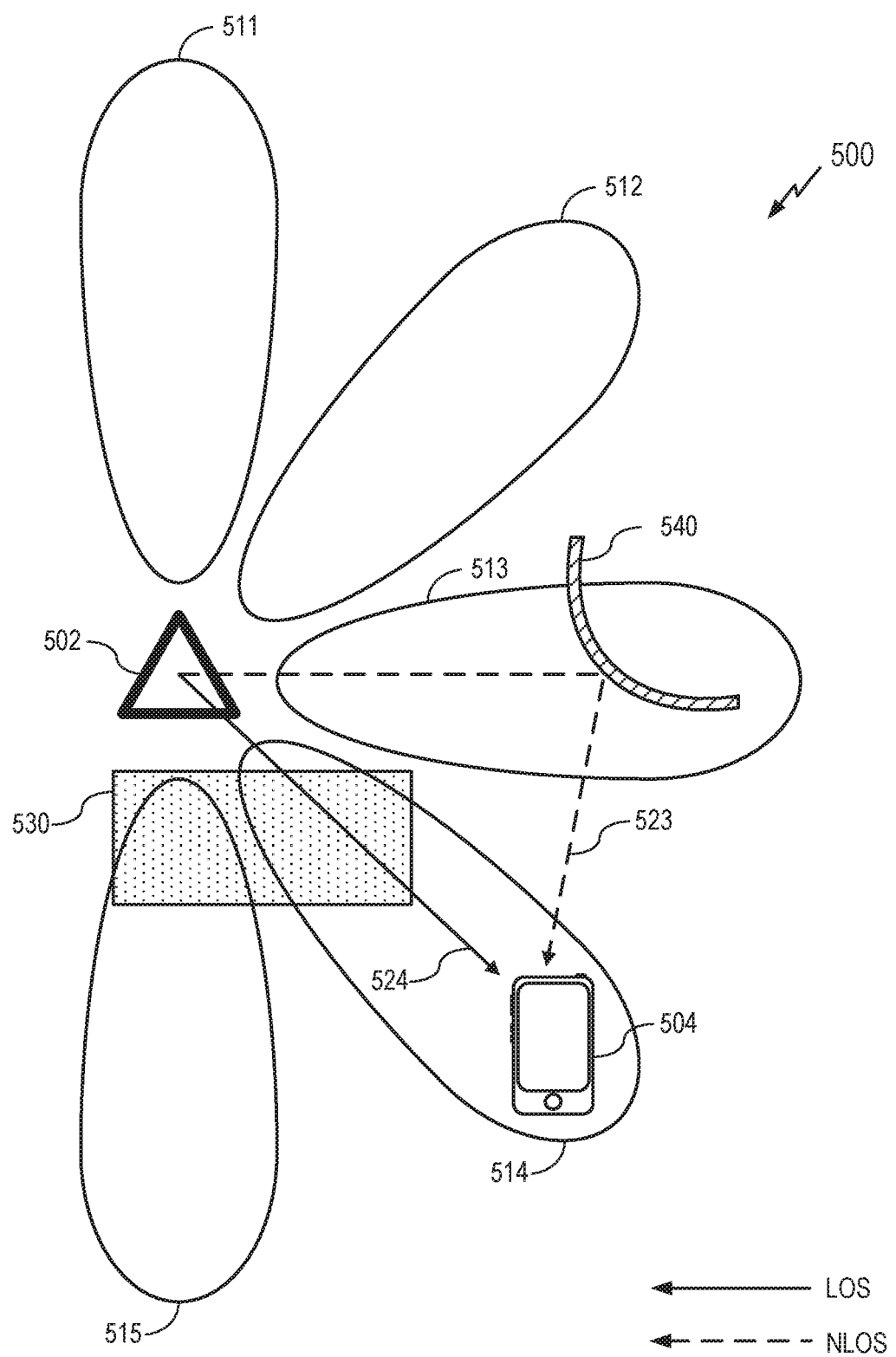
FIG. 5 illustrates an exemplary wireless communications system according to various aspects of the disclosure.

FIG. 5 illustrates an exemplary wireless communications system 500 according to various aspects of the disclosure. In the example of FIG. 5, a UE 504, which may correspond to UE 404 in FIG. 4, is attempting to calculate an estimate of its position, or to assist another entity (e.g., a base station or core network component, another UE, a location server, a third-party application, etc.) to calculate an estimate of its position. The UE 504 may communicate wirelessly with a base station 502, which may correspond to one of base stations 402 in FIG. 4, using RF signals and standardized protocols for the modulation of the RF signals and the exchange of information packets.

As illustrated in FIG. 5, the base station 502 is utilizing beamforming to transmit a plurality of beams 511-515 of RF signals. Each beam 511-515 may be formed and transmitted by an array of antennas of the base station 502. Although FIG. 5 illustrates a base station 502 transmitting five beams, it will be appreciated that (i) there may be more or fewer than five beams, (ii) beam shapes such as peak gain, width, and side-lobe gains may differ amongst the transmitted beams, and (iii) some of the beams may be transmitted by a different base station.

A beam index may be assigned to each of the plurality of beams 511-515 for purposes of distinguishing RF signals associated with one beam from RF signals associated with another beam. Further, the RF signals associated with a particular beam of the plurality of beams 511-515 may carry a beam index indicator. A beam index may also be derived from the time of transmission, e.g., frame, slot, and/or OFDM symbol number, of the RF signal. The beam index indicator may be, for example, a three-bit field for uniquely distinguishing up to eight beams. If two different RF signals having different beam indices are received, the different beam indices would indicate that the RF signals were transmitted using different beams. If two different RF signals share a common beam index, the common beam index would indicate that the different RF signals are transmitted using the same beam. Another way to describe that two RF signals are transmitted using the same beam is to say that the antenna port(s) used for the transmission of first RF signal is (are) spatially quasi-collocated with the antenna port(s) used for the transmission of the second RF signal.

In the example of FIG. 5, the UE 504 receives an NLOS data stream 523 of RF signals transmitted on beam 513 and an LOS data stream 524 of RF signals transmitted on beam 514. Although FIG. 5 illustrates the NLOS data stream 523 and the LOS data stream 524 as single lines (dashed and solid, respectively), as will be appreciated, the NLOS data stream 523 and the LOS data stream 524 may each comprise multiple rays (i.e., a "cluster") by the time they reach the UE 504 due, for example, to the propagation characteristics of RF signals through multipath channels. That is, a cluster of RF signals may be formed when an electromagnetic wave is reflected from multiple surfaces of an object, and the resulting reflections arrive at the receiver (e.g., UE 504) from roughly the same angle, each travelling a few wavelengths (e.g., centimeters) more or less than others. Such a "cluster" of received RF signals will generally correspond with a single transmitted RF signal.

In the example of FIG. 5, the NLOS data stream 523 is not originally directed at the UE 504. However, as will be appreciated, it could be, as are the RF signals on the NLOS paths 412 depicted in FIG. 4. The NLOS data stream 523 is reflected from a reflector 540 (e.g., a building) and reaches the UE 504 without further obstruction, and may therefore still be a relatively strong RF signal. By contrast, the LOS data stream 524 is directed at the UE 504 but passes through an obstruction 530 (e.g., vegetation, a building, a hill, a disruptive environment such as clouds, or smoke, etc.), which may significantly degrade the RF signal. As will be appreciated, although the LOS data stream 524 is weaker than the NLOS data stream 523, the LOS data stream 524 will nonetheless arrive at the UE 504 before the NLOS data stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP or SINR). By contrast, the beam of interest for position estimation is the beam carrying RF signals that excite the LOS path and that has the highest gain along the LOS path amongst all other beams (e.g., beam 514). That is, even if beam 513 (the NLOS beam) were to weakly excite the LOS path (due to the propagation characteristics of RF signals, and even though not being focused along the LOS path), that weak signal, if any, of the LOS path of beam 513 may not be as reliably detectable compared to that from beam 514, thus contributing to errors in performing a positioning measurement.

While the beam of interest for data communication and the beam of interest for position estimation may be the same beams for some frequency bands, for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference RF signals transmitted by the base station 502, the beam of interest for the data communication session may be the beam 513, as it is carrying the unobstructed NLOS data stream 523. The beam of interest for position estimation, however, would be the beam 514, as it carries the strongest LOS data stream 524, despite being obstructed.

Figure 6A:
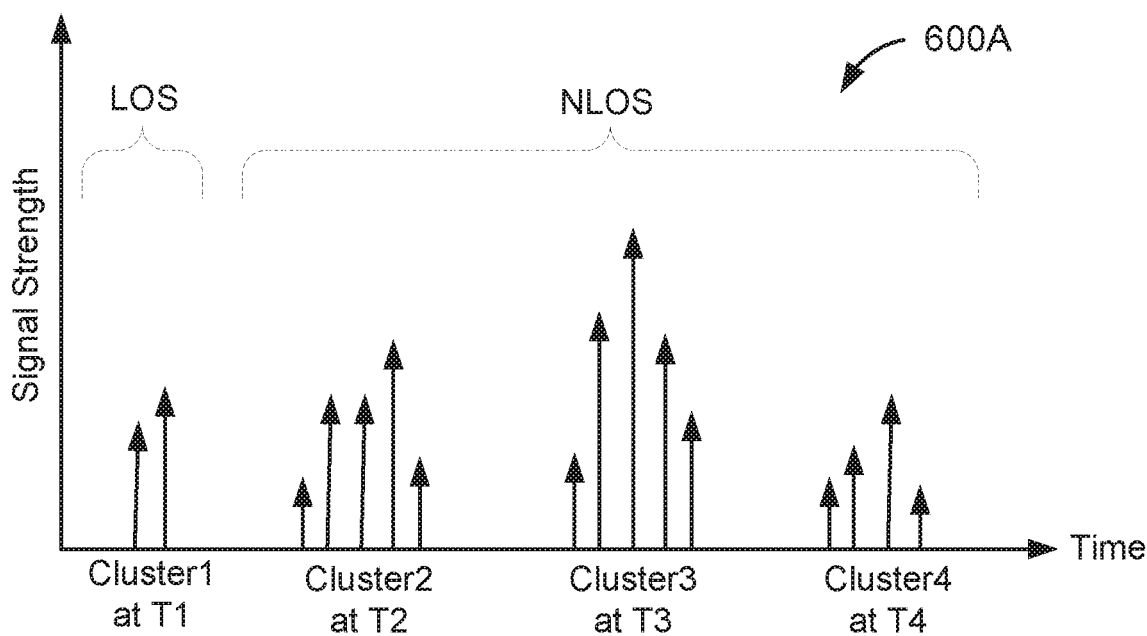
FIG. 6A is a graph showing the RF channel response at a UE over time according to aspects of the disclosure.

FIG. 6A is a graph 600A showing the RF channel response at a receiver (e.g., UE 504) over time according to aspects of the disclosure. Under the channel illustrated in FIG. 6A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6A, because the first cluster of RF signals at time T1 arrives first, it is presumed to be the LOS data stream (i.e., the data stream arriving over the LOS or the shortest path), and may correspond to the LOS data stream 524. The third cluster at time T3 comprises the strongest RF signals, and may correspond to the NLOS data stream 523. Seen from the transmitter's side, each cluster of received RF signals may comprise the portion of an RF signal transmitted at a different angle, and thus each cluster may be said to have a different angle of departure (AoD) from the transmitter.

Figure 6B:
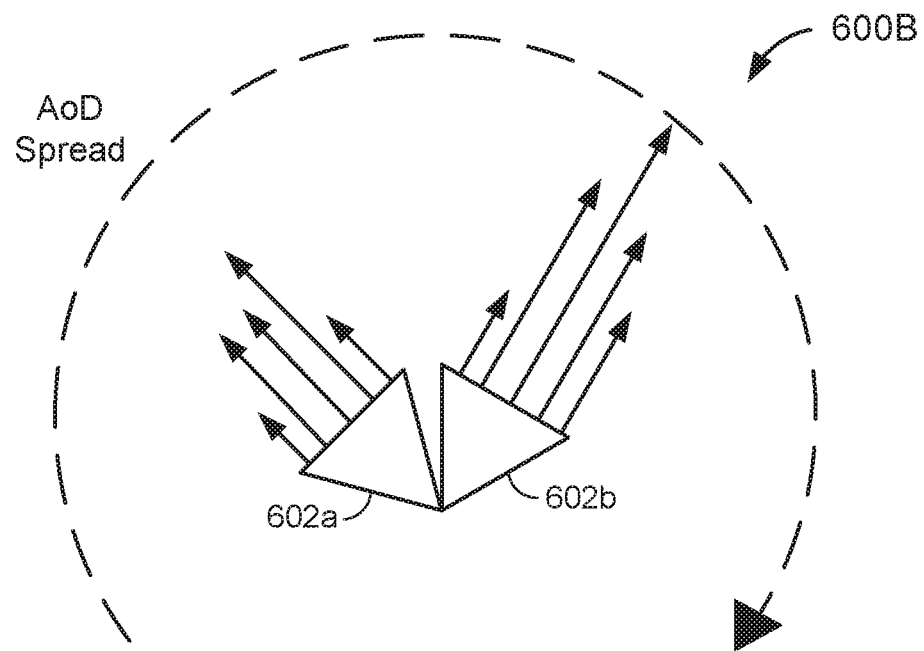
FIG. 6B illustrates an exemplary separation of clusters in Angle of Departure (AoD) according to aspects of the disclosure.

FIG. 6B illustrates this separation of clusters in an AoD spread 600B. The RF signal transmitted in AoD range 602a may correspond to one cluster (e.g., "Cluster1") in FIG. 6A, and the RF signal transmitted in AoD range 602b may correspond to a different cluster (e.g., "Cluster3") in FIG. 6A. Note that although AoD ranges of the two clusters depicted in FIG. 6B are spatially isolated, AoD ranges of some clusters may also partially overlap even though the clusters are separated in time. For example, this may arise when two separate buildings at a same AoD from the transmitter reflect the signal towards the receiver. Note that although FIG. 6A illustrates clusters of two to five channel taps, as will be appreciated, the clusters may have more or fewer than the illustrated number of channel taps.

As in the example of FIG. 5, the base station may utilize beamforming to transmit a plurality of beams of RF signals such that one of the beams (e.g., beam 514) is directed at the AoD range 602a of the first cluster of RF signals, and a different beam (e.g., beam 513) is directed at the AoD range 602b of the third cluster of RF signals. The signal strength of clusters in post-beamforming channel response (i.e., the channel response when the transmitted RF signal is beamformed instead of omnidirectional) will be scaled by the beam gain along the AoD of the clusters. In that case, the beam of interest for positioning would be the beam directed at the AoD of the first cluster of RF signals, as they arrive first, and the beam of interest for data communications may be the beam directed at the AoD of the third cluster of RF signals, as they are the strongest.

In general, when transmitting an RF signal, the transmitter does not know what path it will follow to the receiver (e.g., UE 504) or at what time it will arrive at the receiver, and therefore transmits the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

As discussed above, in some frequency bands, the shortest path (which, as noted above, may be a LOS path or the shortest NLOS path) may be weaker than an alternative longer (NLOS) path (over which the RF signal arrives later due to propagation delay). Thus, where a transmitter uses beamforming to transmit RF signals, the beam of interest for data communication—the beam carrying the strongest RF signals—may be different from the beam of interest for position estimation—the beam carrying the RF signals that excite the shortest detectable path. As such, it would be beneficial for the receiver to identify and report the beam of interest for position estimation to the transmitter to enable the transmitter to subsequently modify the set of transmitted beams to assist the receiver to perform a position estimation.

Figure 7:
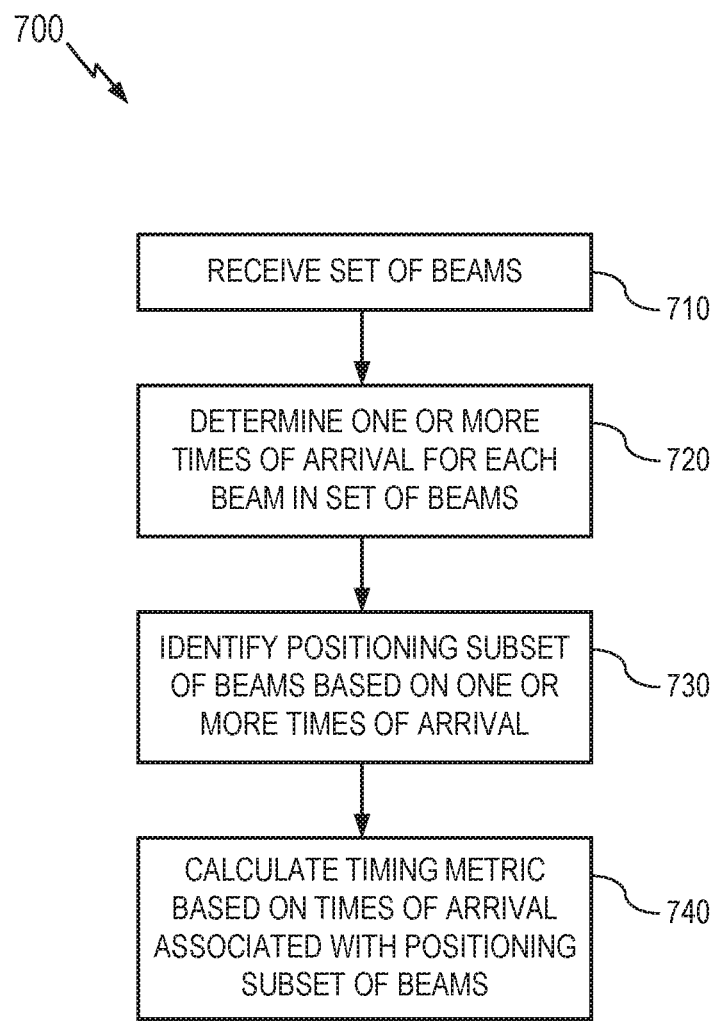
FIG. 7 illustrates an exemplary method, according to various aspects.

FIG. 7 illustrates an exemplary method 700, according to various aspects. The method 700 depicted in FIG. 7 may be performed by, for example, any or all of the UEs, base stations, or access points depicted in FIGS. 1-5. For example, the method 700 may be performed by any of the base stations 102, UEs 104, WLAN AP 150, WLAN STA 152, mmW base station 180, or UE 182 depicted in FIG. 1, the UE 104, gNB 222, or eNB 224 depicted in FIG. 2A, the UE 240, gNB 222, or eNB 224 depicted in FIG. 2B, the base station 310 or UE 350 depicted in FIG. 3, any of the base stations 402 or the UE 404 depicted in FIG. 4, the base station 502 or the UE 504 depicted in FIG. 5, or any component analogous thereto.

At 710 of the method 700, a set of beams is received. The receiving may be performed by, for example, one or more transceiver/antenna combinations analogous to the receiver 354RX and/or antenna 352 depicted in FIG. 3. Accordingly, the receiver 354RX and/or antenna 352 may constitute means for receiving a set of beams.

At 720 of the method 700, one or more times of arrival are determined for each beam in the set of beams received at 710. The determining may be performed by, for example, the controller/processor 359 and/or the memory 360 depicted in FIG. 3. Accordingly, the controller/processor 359 and/or the memory 360 may constitute means for determining a time of arrival for each beam in the set of beams.

At 730 of the method 700, a positioning subset of beams is identified, based on the one or more times of arrival for each beam determined at 720. For example, the positioning subset of beams may comprise a single beam with the earliest time of arrival amongst all beams in the set of beams received at 710. As used herein, the phrase "based on" should be construed as "based at least in part on" rather than, for example, "based solely on," unless the context clearly indicates the latter. The identifying may be performed by, for example, the controller/processor 359 and/or the memory 360 depicted in FIG. 3. Accordingly, the controller/processor 359 and/or the memory 360 may constitute means for identifying a positioning subset of beams based on the times of arrival.

At 740 of the method 700, a timing metric is calculated, based on the one or more times of arrival associated with the positioning subset of beams. The calculating may be performed by, for example, the controller/processor 359 and/or the memory 360 depicted in FIG. 3. Accordingly, the controller/processor 359 and/or the memory 360 may constitute means for determining a timing metric based on one or more times of arrival associated with the positioning subset of beams.

As noted above, the method 700 may be used to identify a beam that is optimal for positioning measurements. In some implementations, the method 700 may be implemented in combination with a method for identifying a beam that is optimal for purposes of data exchange. The method for identifying a beam that is optimal for purposes of data exchange may comprise (i) determining a signal strength for each beam in the set of beams, (ii) identifying a data subset of beams (i.e., a subset of the beams for data exchange) based on the signal strengths, wherein the data subset of beams is smaller than the set of beams and includes one or more beams from the set of beams, and then (iii) exchanging data via the data subset of beams and/or requesting a data exchange via the data subset of beams. If the method 700 and the method just described for identifying a beam that is optimal for purposes of data exchange are both implemented, then the node may use one beam for positioning measurements and a different beam for data exchange. For example, the data subset of beams may include at least one beam that is not included in the positioning subset of beams.

Figure 8:
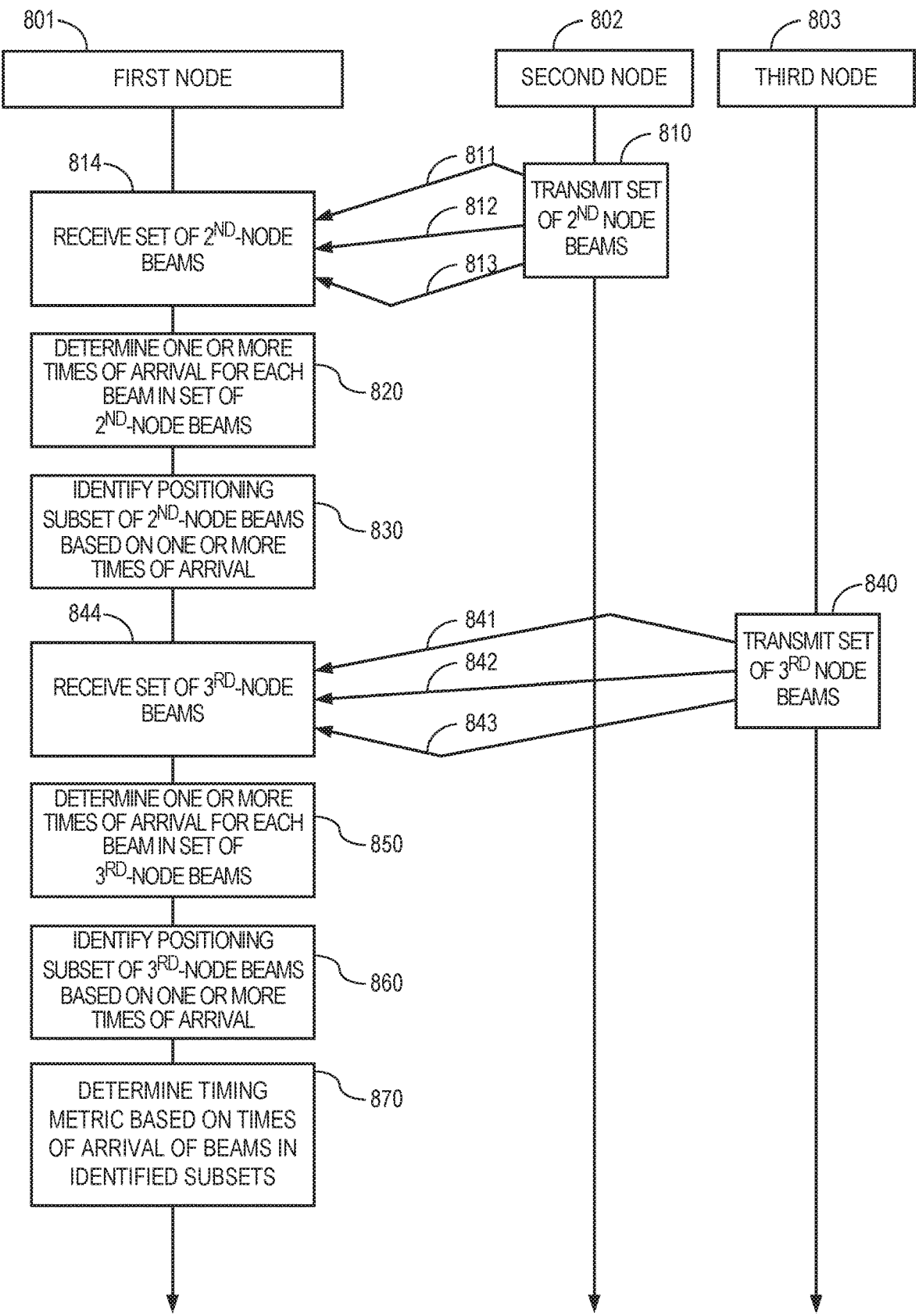
FIG. 8 illustrates an exemplary signal flow diagram, according to various aspects.

FIG. 8 illustrates an exemplary signal flow diagram, according to various aspects. FIG. 8 depicts a first node 801, a second node 802, and a third node 803. The first node 801 may be analogous to any of the UEs, base stations, eNBs, or access points depicted in FIGS. 1-5. Like the first node 801, the second node 802 and the third node 803 may be analogous to any of the UEs, base stations, eNBs, or access points depicted in FIGS. 1-5. However, it will be understood that the first node 801, second node 802, and third node 803 are different nodes that are configured to communicate with each other.

At 810, the second node 802 transmits a set of second-node beams, including a first beam 811, a second beam 812, and a third beam 813. The second node 802 may transmit the beams 811-813 at different AoDs, as illustrated above in FIGS. 5 and 6B. For illustrative purposes, three beams are depicted in FIG. 8, but it will be understood that any number of beams may be transmitted at 810. Moreover, the set of beams may include one or more spatially-multiplexed beams analogous to the beamforming 184 depicted in FIG. 1 or the beams 511-515 depicted in FIG. 5. The set of beams may be transmitted simultaneously and/or intermittently.

In some implementations, the set of beams may be a set of positioning beams. Each positioning beam may carry a timing beacon signal. In other implementations, the set of beams may be a set of reference-signaling beams, for example, Primary Synchronization Signal (PSS), Secondary Synchronization Signal (SSS), Physical Broadcast Channel (PBCH) blocks, Channel State Information Reference Signal (CSI-RS), etc. The second node 802 may transmit both the set of positioning beams and the set of reference-signaling beams. As will be discussed in greater detail below, in the event that the set of positioning beams and the set of reference-signaling beams are spatially Quasi-Co-Located (QCL), then the first node 801 may use the set of reference-signaling beams as a proxy for the set of positioning beams, and use the reference-signaling beams to short-list the relevant positioning beams for reception. In particular, if certain reference-signaling beams are undetectable or too weak, or their times of arrival are too late, then there may be no need for the first node to receive the corresponding positioning beams or calculate times of arrival of the corresponding positioning beams. The QCL information may be provided to the first node 801 by the second node 802 or any other suitable node.

At 814, the first node 801 receives the set of second-node beams 811-813. As discussed previously, each beam in the set of second-node beams may travel a different path from the second node 802 to the first node 801. For example, the first beam 811 and the third beam 813 may travel NLOS paths, whereas the second beam 812 may travel a LOS path.

At 820, the first node 801 determines one or more times of arrival for each beam in the set of second-node beams. For example, the first beam 811 may have a first range of times of arrival, the second beam 812 may have a second range of times of arrival, and the third beam 813 may have a third range of times of arrival.

The times of arrival for each beam may be determined at 820 in any suitable manner. For example, if the beam is received as a single RF signal, then the time of arrival of the beam may be calculated as being equal to the time of arrival of the single RF signal. If the beam is received as a cluster of multiple RF signals (for example, multiple RF signals having a common beam index, as indicated by the beam index indicator), then the time of arrival of the beam may be calculated in any of a number ways. For example, the time of arrival of the beam may be set equal to a time of arrival of the earliest-arriving RF signal in the cluster, an average time of arrival across each of the multiple RF signals in the cluster, a time of arrival of the highest-strength RF signal from among the multiple RF signals in the cluster, or any combination thereof. In some implementations, the first node 801 may discard times of arrival associated with RF signals having a signal strength that does not exceed a signal strength threshold, and calculate the time of arrival of the beam based solely on an RF signal (or RF signals) that do exceed the signal strength threshold. The first node 801 may estimate the channel response from the received signal and take as time of arrival the earlier detected channel tap. It will be appreciated that other determinations at 820 of the times of arrival for each beam are possible.

At 830, the first node 801 identifies a positioning subset of second-node beams based on the one or more times of arrival determined at 820. The positioning subset of second-node beams may include one or more beams from the set of second-node beams received at 814, but may omit one or more other beams from the set of second-node beams received at 814. For example, the second beam 812 may have earlier times of arrival than the first beam 811 and the third beam 813. Accordingly, the second beam 812 may be included in the position subset of second-node beams identified at 830, whereas the first beam 811 and the third beam 813 may be omitted from the position subset of second-node beams.

If the first node 801 is a MIMO node that includes multiple transceivers, the first node 801 may perform reception beamforming with respect to the positioning subset of beams identified at 830. In particular, once the first node 801 identifies a beam of interest for positioning purposes, the first node 801 can perform spatial filtering in order to increase the gain of the signal carried on the identified beam.

As noted above, the process of receiving a set of second-node beams (as at 814), determining a time of arrival for each (as at 820), and identifying a positioning subset (as at 830), is performed with respect to the set of second-node beams 811-813 received from the second node 802. As shown elsewhere in FIG. 8, the process may be repeated with respect to the third node 803 and a set of third-node beams 841-843 transmitted therefrom.

At 840, the third node 803 transmits the set of third-node beams including a first beam 841, a second beam 842, and a third beam 843. The transmitting may be analogous to the transmitting performed by the second node 802 at 810.

At 844, the first node 801 receives the set of third-node beams. The receiving may be analogous to the receiving performed by the first node 801 at 814.

At 850, the first node 801 determines one or more times of arrival for each beam in the set of third-node beams. The determining may be analogous to the determining performed by the first node 801 at 820.

At 860, the first node 801 identifies a positioning subset of third-node beams based on the one or more times of arrival determined at 850. The identifying may be analogous to the identifying performed by the first node 801 at 830.

At 870, the first node 801 determines a timing metric based on the one or more times of arrival of the beams in the identified positioning subsets. For example, as will be discussed in greater detail below, the first node 801 may calculate an OTDOA timing metric.

In the present example, suppose that the second node 802 sends out a second-node timing beacon using a set of eight different second-node beams, and the third node 803 sends out a third-node timing beacon using a set of fourteen different third-node beams. The first node 801 may receive the set of eight different second-node beams (at 814) and the set of fourteen different third-node beams (at 844). At 820, the first node 801 may determine that beam #3 has the earliest time of arrival of all the beams in the set of eight different second-node beams. For example, beam #3 may arrive from the second node 802 two-hundred samples after the start of a signal reception window (for example, a Discrete Fourier transform (DFT) window), with all other beams in the set of second-node beam arriving after more than two-hundred samples. At 850, the first node 801 may determine that beam #10 has the earliest time of arrival of all the beams in the set of fourteen different third-node beams. For example, beam #10 may arrive from the second node 802 two-hundred and fifty samples after the start of the signal reception window, with all other beams in the set of third-node beam arriving after more than two-hundred and fifty samples.

Accordingly, the first node 801 may identify beam #3 of the set of second-node beams as being the second-node positioning subset (at 830). The first node 801 may further identify beam #10 of the set of third-node beams as being the third-node positioning subset (at 860). At 870, the first node 801 may use the times of arrival of beam #3 of the set of second-node beams and beam #10 of the set of third-node beams to calculate a timing metric. In particular, the first node 801 may calculate a difference between the times of arrival (250−200=50 samples). This value may constitute an OTDOA timing metric that can be used, in conjunction with other calculations, to determine a position of the first node 801. It will be further understood that while beam #3 and beam #10 are used for positioning applications, a different beam altogether may be used for data communication. The use may be simultaneous. For example, beam #7 of the set of second-node beams may have the highest signal strength of any of the beams received at 814 or 844. Accordingly, the first node 801 may use beam #7 of the set of second-node beams to perform data communication.

To perform OTDOA positioning, the first node 801 may calculate two time difference values. The first node 801 selects a reference node (for example, the second node 802) and two neighbor nodes (for example, the third node 803 and a fourth node (substantially similar to the third node 803, but omitted from FIG. 8 for brevity)). The first time difference value $OTDOA_1$ may be determined by calculating a difference between the times of arrival for signals received from the second node 802 and the third node 803 (for example, 50 samples, as in the previous example). This process is shown in FIG. 8. The second time difference value $OTDOA_2$ may be determined by calculating a difference between the times of arrival for signals received from the second node 802 and the fourth node. Once the two time difference values $OTDOA_1$ and $OTDOA_2$ have been calculated, they can be used to determine a set of distances between the first node 801 and the other three nodes (the second node 802, the third node 803, and the fourth node). If the positions of the other three nodes are known (for example, by latitude, longitude, and/or altitude), then the position of the first node 801 can be determined using known multilateration techniques.

The aforementioned positioning calculations may be performed at the first node 801 using the components of the first node 801. In this case, the absolute positions of the other three nodes may be, for example, stored at and/or communicated to the first node 801. Alternatively, measurement results (for example, times of arrival and/or OTDOAs) may be transmitted to an external device (for example, a location server) and the external device may use or calculate the time difference values $OTDOA_1$ and $OTDOA_2$ to determine a position of the first node 801. In this case, the absolute positions of the other three nodes need only be stored in the location server. To report the two time difference values $OTDOA_1$ and $OTDOA_2$ to the location server, it may be necessary to identify the nodes and/or beams that were used to calculate the two time difference values $OTDOA_1$ and $OTDOA_2$. The result of the position determination may be used at the location server to perform other calculations, transmitted to another server, or transmitted back to the first node 801.

Figure 9:
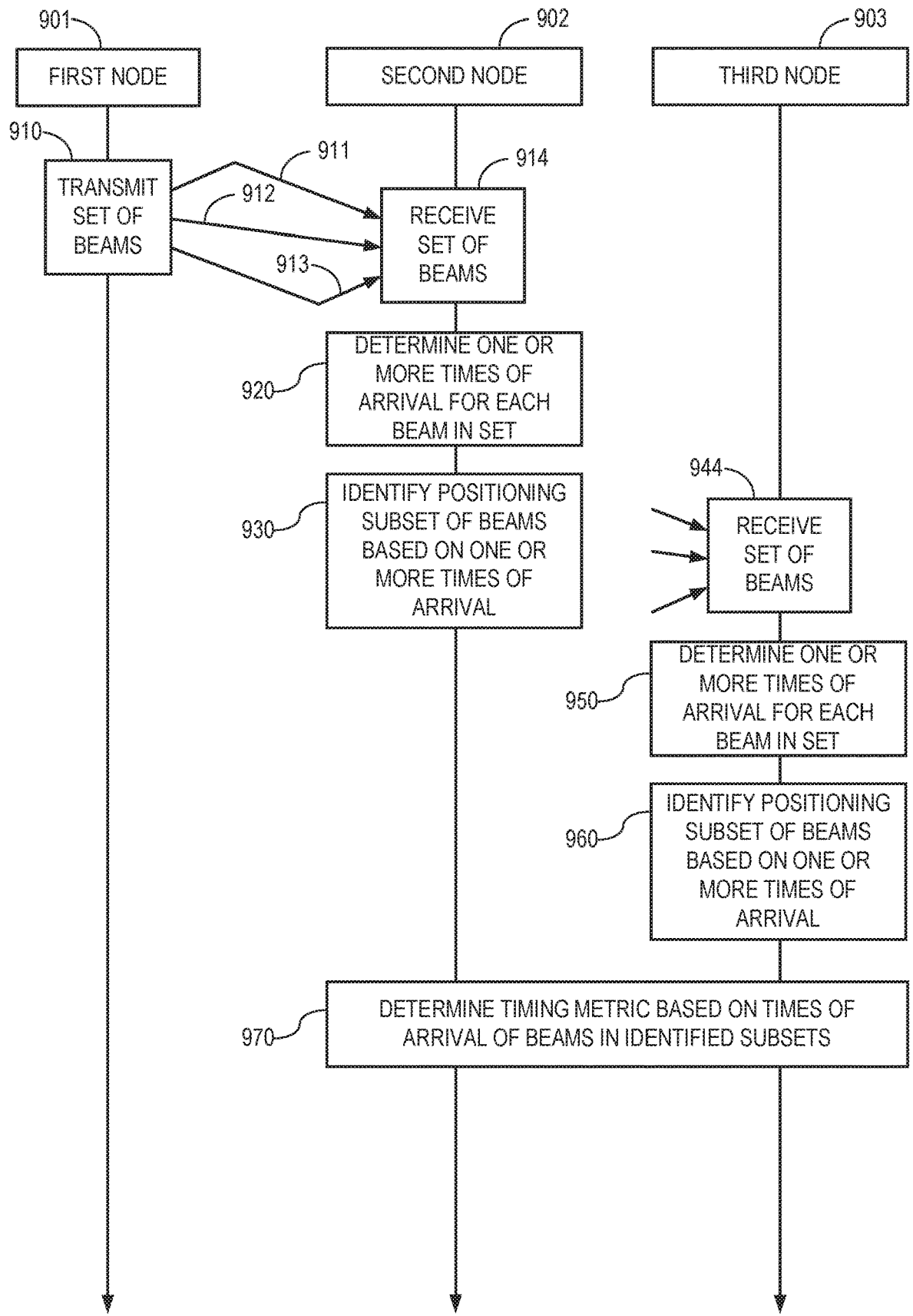
FIG. 9 illustrates another exemplary signal flow diagram, according to various aspects.

FIG. 9 illustrates another exemplary signal flow diagram, according to various aspects. FIG. 9 depicts a first node 901, a second node 902, and a third node 903 analogous to the first node 801, the second node 802, and the third node 803 depicted in FIG. 8. In FIG. 9, the timing metric is calculated differently from the timing metric calculated in FIG. 8. In particular, the set of beams are transmitted from the first node 901, rather than to the first node 901 (as depicted in FIG. 8).

At 910, the first node 901 transmits a set of first-node beams, including a first beam 911, a second beam 912, and a third beam 913. For illustrative purposes, three beams are depicted in FIG. 9, but it will be understood that any number of beams may be transmitted at 910. Further, the set of beams may include one or more spatially-multiplexed beams analogous to the beamforming 184 depicted in FIG. 1 or the beams 511-515 depicted in FIG. 5. The set of beams may be simultaneously transmitted at 910.

At 914, the second node 902 receives the set of beams. As discussed previously, each beam in the set of first-node beams may travel a different path from the second node 902 to the first node 901. For example, the first beam 911 and the third beam 913 may travel NLOS paths, whereas the second beam 912 may travel an LOS path.

At 920, the second node 902 determines one or more times of arrival for each beam in the set of first-node beams. For example, the first beam 911 may have a first range of times of arrival, the second beam 912 may have a second range of times of arrival, and the third beam 913 may have a third range of times of arrival. The times of arrival for each beam may be determined at 920 in any suitable manner, as noted above in the description of FIG. 8.

At 930, the second node 902 identifies a positioning subset of beams based on the one or more times of arrival determined at 920. The positioning subset of beams may include one or more beams from the set of first-node beams received at 914, but may omit one or more other beams from the set of first-node beams received at 914. For example, the second beam 912 may have earlier times of arrival than the first beam 911 and the third beam 913. Accordingly, the second beam 912 may be included in the position subset of first-node beams identified at 930, whereas the first beam 911 and the third beam 913 may be omitted.

As noted above, the process of receiving a set of first-node beams (as at 914), determining a time of arrival for each (as at 920), and identifying a positioning subset (as at 930) is performed at the second node 902 with respect to the set of first-node beams 911-913 received from the first node 901. As shown in FIG. 9, the process may be repeated with respect to the third node 903.

At 944, the third node 903 receives the set of first-node beams. FIG. 9 clearly illustrates the set of beams 911-913 being received at the second node 902. The set of beams 911-913 may also be received at the third node 903, although signal flow arrows are partially omitted for clarity of illustration. Generally, it will be understood that the third node 903 receives a set of first-node beams from the first node 901, which may be identical to or analogous to the beams 911-913 received by the second node 902.

At 950, the third node 903 determines one or more times of arrival for each beam in the set of first-node beams. The determining may be analogous to the determining performed by the first node 901 at 920.

At 960, the third node 903 identifies a positioning subset of first-node beams based on the one or more times of arrival determined at 920. The identifying may be analogous to the identifying performed by the first node 901 at 920.

At 970, the second node 902 and the third node 903 may coordinate to determine a timing metric based on the relative times of arrival of the beams in the identified positioning subsets. For example, the second node 902 may transmit to (or receive from) the third node 903 data relating to times of arrival associated with the positioning subset of beams identified at 930 (or 960). Additionally, or alternatively, the second node 902 and the third node 903 may both transmit data relating to times of arrival to, for example, the first node 901, a location server (not shown), and/or another suitable node. In this case, the first node 901, location server, or another suitable node may use the two times of arrival to determine a timing metric analogous to the $OTDOA_1$ (described above with respect to FIG. 8).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method, comprising:
receiving, at a first node, a set of beams from a second node;

determining one or more times of arrival for each beam in the set of beams;

identifying a positioning subset of beams based on the one or more times of arrival for each beam in the set of beams, wherein the positioning subset of beams is smaller than the set of beams and includes one or more beams from the set of beams, and the positioning subset of beams includes a beam associated with a cluster of multiple RF signals; and calculating a timing metric based on the one or more times of arrival associated with the positioning subset of beams, including at least one of:

a time of arrival of an earliest-arriving RF signal in the cluster;

an average time of arrival of the multiple RF signals in the cluster;

a time of arrival of a highest-strength RF signal of the multiple RF signals in the cluster; or any combination thereof.

2. The method of claim 1, wherein said each beam in the set of beams is associated with a beam index and a transmission angle of departure, wherein said each beam in the set of beams has a different angle of departure and a different beam index from other beams in the set of beams.

3. The method of claim 1, wherein the positioning subset of beams includes one or more beams that are associated with earlier times of arrival than each of one or more remaining beams, wherein the one or more remaining beams are included in the set of beams and not included in the positioning subset of beams, and the method further comprises discarding data relating to the times of arrival associated with each of the one or more remaining beams.

4. The method of claim 1, further comprising:
determining a signal strength for said each beam in the set of beams;
identifying a data subset of beams based on the signal strengths, wherein the data subset of beams is smaller than the set of beams and includes at least one beam that is not included in the positioning subset of beams; and
exchanging the data via the data subset of beams.

5. A method, comprising:
receiving, at a first node, a set of beams from a second node;
determining one or more times of arrival for each beam in the set of beams;
identifying a positioning subset of beams based on the one or more times of arrival for said each beam in the set of beams, wherein the positioning subset of beams is smaller than the set of beams and includes one or more beams from the set of beams; and
calculating a timing metric based on the one or more times of arrival associated with the positioning subset of beams,
wherein the set of beams is a set of second-node beams, the positioning subset of beams is a positioning subset of the second-node beams, and the timing metric is a second-node timing metric, and wherein the method further comprises:
receiving, at the first node, a set of third-node beams from a third node;
determining one or more times of arrival for each beam in the set of the third-node beams;
identifying a positioning subset of the third-node beams based on the one or more times of arrival, wherein the positioning subset of the third-node beams is smaller than the set of the third-node beams and includes one or more beams from the set of the third-node beams; and
calculating a third-node timing metric based on the one or more times of arrival associated with the positioning subset of the third-node beams.

6. The method of claim 5, further comprising calculating an Observed Time Difference Of Arrival (OTDOA) timing metric based on the second-node timing metric and the third-node timing metric.

7. A method, comprising:
receiving, at a first node, a set of beams from a second node;
determining one or more times of arrival for each beam in the set of beams;
identifying a positioning subset of beams based on the one or more times of arrival for said each beam in the set of beams, wherein the positioning subset of beams is smaller than the set of beams and includes one or more beams from the set of beams; and
calculating a timing metric based on the one or more times of arrival associated with the positioning subset of beams,
wherein the timing metric is a second-node timing metric, and the method further comprises:
receiving a third-node timing metric from a third node;
wherein calculating the timing metric further comprises calculating an Observed Time Difference Of Arrival (OTDOA) metric equal to a difference between the second-node timing metric and the third-node timing metric.

8. The method of claim 1, wherein:
receiving the set of beams comprises receiving a set of positioning beams; and
each beam in the set of positioning beams carries a timing beacon signal.

9. A method, comprising:
receiving, at a first node, a set of beams from a second node;
determining one or more times of arrival for each beam in the set of beams;
identifying a positioning subset of beams based on the one or more times of arrival for each beam in the set of beams, wherein the positioning subset of beams is smaller than the set of beams and includes one or more beams from the set of beams; and
calculating a timing metric based on the one or more times of arrival associated with the positioning subset of beams, wherein:
receiving the set of beams comprises receiving a set of reference-signaling beams; and
identifying the positioning subset of beams comprises:
receiving Quasi-Co-Location (QCL) information;
determining, based on the QCL information, whether the set of reference-signaling beams has a same spatial QCL as a set of positioning beams transmitted by the second node; and
identifying the positioning subset of beams based on the times of arrival associated with the set of reference-signaling beams.

10. An apparatus, comprising:
at least one transceiver configured to receive, at a first node, a set of beams from a second node;
a memory configured to store data and/or instructions; and
one or more processors, coupled to the memory and the at least one transceiver, that is configured to:

determine one or more times of arrival for each beam in the set of beams;
identify a positioning subset of beams based on the one or more times of arrival for said each beam in the set of beams, wherein the positioning subset of beams is smaller than the set of beams and includes one or more beams from the set of beams, and the positioning subset of beams includes a beam associated with a cluster of multiple RF signals; and
calculate a timing metric based on the one or more times of arrival associated with the positioning subset of beams, including at least one of:
a time of arrival of an earliest-arriving RF signal in the cluster;
an average time of arrival of the multiple RF signals in the cluster;
a time of arrival of a highest-strength RF signal of the multiple RF signals in the cluster; or
any combination thereof.

11. The apparatus of claim 10, wherein said each beam in the set of beams is associated with a beam index and a transmission angle of departure, wherein said each beam in the set of beams has a different angle of departure and a different beam index from other beams in the set of beams.

12. The apparatus of claim 10, wherein the positioning subset of beams includes one or more beams that are associated with earlier times of arrival than each of one or more remaining beams, wherein the one or more remaining beams are included in the set of beams and not included in the positioning subset of beams, the one or more processors further configured to discard data relating to the times of arrival associated with each of the one or more remaining beams.

13. The apparatus of claim 10, wherein the one or more processors is further configured to:
determine a signal strength for said each beam in the set of beams;
identify a data subset of beams based on the signal strengths, wherein the data subset of beams is smaller than the set of beams and includes at least one beam that is not included in the positioning subset of beams; and
exchange the data via the data subset of beams.

14. An apparatus, comprising:
at least one transceiver configured to receive, at a first node, a set of beams from a second node;
a memory configured to store data and/or instructions; and
one or more processors, coupled to the memory and the at least one transceiver, that is configured to:
determine one or more times of arrival for each beam in the set of beams;
identify a positioning subset of beams based on the one or more times of arrival for each beam in the set of beams, wherein the positioning subset of beams is smaller than the set of beams and includes one or more beams from the set of beams; and
calculate a timing metric based on the one or more times of arrival associated with the positioning subset of beams,
wherein the set of beams is a set of second-node beams, the positioning subset of beams is a positioning subset of the second-node beams, and the timing metric is a second-node timing metric, and wherein:
the at least one transceiver is further configured to receive, at the first node and from a third node, a set of third-node beams; and
the one or more processors is further configured to:
determine a time of arrival for each beam in the set of the third-node beams;
identify a positioning subset of third-node beams based on the time of arrival, wherein the positioning subset of the third-node beams is smaller than the set of the third-node beams and includes one or more beams from the set of the third-node beams; and
calculate a third-node timing metric based on one or more times of arrival respectively associated with each beam in the positioning subset of the third-node beams.

15. The apparatus of claim 14, wherein the one or more processors is further configured to calculate an Observed Time Difference Of Arrival (OTDOA) timing metric based on the second-node timing metric and the third-node timing metric.

16. An apparatus, comprising:
at least one transceiver configured to receive, at a first node, a set of beams from a second node;
a memory configured to store data and/or instructions; and
one or more processors, coupled to the memory and the at least one transceiver, that is configured to:
determine one or more times of arrival for each beam in the set of beams;
identify a positioning subset of beams based on the one or more times of arrival for each beam in the set of beams, wherein the positioning subset of beams is smaller than the set of beams and includes one or more beams from the set of beams; and
calculate a timing metric based on the one or more times of arrival associated with the positioning subset of beams, wherein:
the timing metric is a second-node timing metric;
the at least one transceiver is further configured to receive a third-node timing metric from a third node; and
the one or more processors is further configured to calculate the timing metric, and an Observed Time Difference Of Arrival (OTDOA) metric equal to a difference between the second-node timing metric and the third-node timing metric.

17. The apparatus of claim 10, wherein to receive the set of beams, the at least one transceiver is configured to receive a set of positioning beams, wherein each beam in the set of positioning beams carries a timing beacon signal.

18. An apparatus, comprising:
at least one transceiver configured to receive, at a first node, a set of beams from a second node;
a memory configured to store data and/or instructions; and
one or more processors, coupled to the memory and the at least one transceiver, that is configured to:
determine one or more times of arrival for each beam in the set of beams;
identify a positioning subset of beams based on the one or more times of arrival for each beam in the set of beams, wherein the positioning subset of beams is smaller than the set of beams and includes one or more beams from the set of beams; and
calculate a timing metric based on the one or more times of arrival associated with the positioning subset of beams, wherein:
to receive the set of beams, the at least one transceiver is configured to receive a set of reference-signaling beams;
to identify the positioning subset of beams, the at least one transceiver is configured to receive Quasi-Co-Location (QCL) information; and
the one or more processors is configured to:

determine, based on the QCL information, whether the set of reference-signaling beams has a same spatial QCL as a set of positioning beams transmitted by the second node; and identify the positioning subset of beams based on the times of arrival associated with the set of reference-signaling beams.

19. An apparatus, comprising:

means for receiving, at a first node, a set of beams from a second node;

means for determining one or more times of arrival for each beam in the set of beams;

means for identifying a positioning subset of beams based on the one or more times of arrival for each beam in the set of beams, wherein the positioning subset of beams is smaller than the set of beams and includes one or more beams from the set of beams, and the positioning subset of beams includes a beam associated with a cluster of multiple RF signals; and means for calculating a timing metric based on the one or more times of arrival associated with the positioning subset of beams, including at least one of:

a time of arrival of an earliest-arriving RF signal in the cluster;

an average time of arrival of the multiple RF signals in the cluster;

a time of arrival of a highest-strength RF signal of the multiple RF signals in the cluster; or any combination thereof.

20. The apparatus of claim 19, wherein said each beam in the set of beams is associated with a beam index and a transmission angle of departure, wherein said each beam in the set of beams has a different angle of departure and a different beam index from other beams in the set of beams.

21. The apparatus of claim 19, wherein the positioning subset of beams includes one or more beams that are associated with earlier times of arrival than each of one or more remaining beams, wherein the one or more remaining beams are included in the set of beams and not included in the positioning subset of beams, and the apparatus further comprises means for discarding data relating to the times of arrival associated with each of the one or more remaining beams.

22. The apparatus of claim 19, further comprising:

means for determining a signal strength for each beam in the set of beams;

means for identifying a data subset of beams based on the signal strengths, wherein the data subset of beams is smaller than the set of beams and includes at least one beam that is not included in the positioning subset of beams; and means for exchanging the data via the data subset of beams.

23. A non-transitory computer-readable medium comprising at least one instruction for causing a processor to perform operations, comprising:

code for receiving, at a first node, a set of beams from a second node;

code for determining one or more times of arrival for each beam in the set of beams;

code for identifying a positioning subset of beams based on the one or more times of arrival for each beam in the set of beams, wherein the positioning subset of beams is smaller than the set of beams and includes one or more beams from the set of beams, and the positioning subset of beams includes a beam associated with a cluster of multiple RF signals; and code for calculating a timing metric based on the one or more times of arrival associated with the positioning subset of beams, including code for calculating the timing metric based on at least one of:

a time of arrival of an earliest-arriving RF signal in the cluster;

an average time of arrival of the multiple RF signals in the cluster;

a time of arrival of a highest-strength RF signal of the multiple RF signals in the cluster; or any combination thereof.

24. The non-transitory computer-readable medium of claim 23, wherein said each beam in the set of beams is associated with a beam index and a transmission angle of departure, wherein said each beam in the set of beams has a different angle of departure and a different beam index from other beams in the set of beams.

25. The non-transitory computer-readable medium of claim 23, wherein the positioning subset of beams includes one or more beams that are associated with earlier times of arrival than each of one or more remaining beams, wherein the one or more remaining beams are included in the set of beams and not included in the positioning subset of beams, the non-transitory computer-readable medium further comprising code for discarding data relating to the times of arrival associated with each of the one or more remaining beams.

26. The non-transitory computer-readable medium of claim 23, further comprising:

code for determining a signal strength for each beam in the set of beams;

code for identifying a data subset of beams based on the signal strengths, wherein the data subset of beams is smaller than the set of beams and includes at least one beam that is not included in the positioning subset of beams; and code for exchanging the data via the data subset of beams.

27. An apparatus, comprising:

means for receiving, at a first node, a set of beams from a second node;

means for determining one or more times of arrival for each beam in the set of beams;

means for identifying a positioning subset of beams based on the one or more times of arrival for each beam in the set of beams, wherein the positioning subset of beams is smaller than the set of beams and includes one or more beams from the set of beams; and means for calculating a timing metric based on the one or more times of arrival associated with the positioning subset of beams, wherein the set of beams is a set of second-node beams, the positioning subset of beams is a positioning subset of the second-node beams, and the timing metric is a second-node timing metric, and wherein the apparatus further comprises:

means for receiving, at the first node, a set of third-node beams from a third node;

means for determining one or more times of arrival for each beam in the set of the third-node beams;

means for identifying a positioning subset of third-node beams based on the one or more times of arrival, wherein the positioning subset of the third-node beams is smaller than the set of the third-node beams and includes one or more beams from the set of the third-node beams; and means for calculating a third-node timing metric based on the one or more times of arrival associated with the positioning subset of the third-node beams.

28. The apparatus of claim 27, further comprising means for calculating an Observed Time Difference Of Arrival (OTDOA) timing metric based on the second-node timing metric and the third-node timing metric.

29. An apparatus, comprising:
means for receiving, at a first node, a set of beams from a second node;
means for determining one or more times of arrival for each beam in the set of beams;
means for identifying a positioning subset of beams based on the one or more times of arrival for each beam in the set of beams, wherein the positioning subset of beams is smaller than the set of beams and includes one or more beams from the set of beams; and
means for calculating a timing metric based on the one or more times of arrival associated with the positioning subset of beams,
wherein the timing metric is a second-node timing metric, and the apparatus further comprises:
means for receiving a third-node timing metric from a third node;
wherein calculating the timing metric further comprises calculating an Observed Time Difference Of Arrival (OTDOA) metric equal to a difference between the second-node timing metric and the third-node timing metric.

30. An apparatus, comprising:
means for receiving, at a first node, a set of beams from a second node;
means for determining one or more times of arrival for each beam in the set of beams;
means for identifying a positioning subset of beams based on the one or more times of arrival for each beam in the set of beams, wherein the positioning subset of beams is smaller than the set of beams and includes one or more beams from the set of beams; and
means for calculating a timing metric based on the one or more times of arrival associated with the positioning subset of beams, wherein:
the means for receiving the set of beams comprises means for receiving a set of reference-signaling beams; and
the means for identifying the positioning subset of beams comprises:
means for receiving Quasi-Co-Location (QCL) information;
means for determining, based on the QCL information, whether the set of reference-signaling beams has a same spatial QCL as a set of positioning beams transmitted by the second node; and
means for identifying the positioning subset of beams based on the times of arrival associated with the set of reference-signaling beams.

* * * * *